(12) United States Patent
Pacini et al.

(10) Patent No.: US 11,837,113 B2
(45) Date of Patent: Dec. 5, 2023

(54) AIRCRAFT PASSENGER WINDOW SHADE WITH ILLUMINATED IMAGE

(71) Applicant: The Boeing Company, Chicago, IL (US)

(72) Inventors: Phillip E. Pacini, Bothell, WA (US); Jay W. Colacecchi, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 787 days.

(21) Appl. No.: 16/868,375

(22) Filed: May 6, 2020

(65) Prior Publication Data

US 2021/0348445 A1   Nov. 11, 2021

(51) Int. Cl.
| | |
|---|---|
| G09F 21/08 | (2006.01) |
| G09F 21/10 | (2006.01) |
| G09F 13/04 | (2006.01) |
| B64C 1/14 | (2006.01) |

(52) U.S. Cl.
CPC ............ G09F 21/10 (2013.01); B64C 1/1484 (2013.01); G09F 13/0409 (2013.01)

(58) Field of Classification Search
CPC ... G09F 21/10; G09F 13/0409; B64C 1/1484; B64D 2011/0061
See application file for complete search history.

(56) References Cited

U.S. PATENT DOCUMENTS

| | | | | |
|---|---|---|---|---|
| 2,092,655 A | * | 9/1937 | Page, Jr. ................. | B64D 11/00 244/118.6 |
| 3,691,686 A | | 9/1972 | Donegan | |
| 4,915,152 A | * | 4/1990 | Magee .................. | B64C 1/1484 160/31 |
| 5,682,939 A | * | 11/1997 | Vargo ..................... | A47H 23/04 160/237 |
| 9,267,325 B2 | | 2/2016 | Cheung | |
| 2015/0068691 A1 | | 3/2015 | Thomas et al. | |
| 2019/0265570 A1 | * | 8/2019 | Whittingham ........ | G02F 1/1533 |

* cited by examiner

Primary Examiner — Cassandra Davis
(74) Attorney, Agent, or Firm — YEE & ASSOCIATES, P.C.

(57) ABSTRACT

A passenger window shade on an aircraft is provided. The passenger window shade includes a first section of the passenger window shade. The first section forms a substantially flat and thin plane. The first section has a first transparency to visible light. The passenger window shade includes a second section of the passenger window shade situated within the first section. The second section includes a second transparency to visible light that is different from the first transparency such that an image is formed inside the aircraft when visible light is aimed at the passenger window shade from outside the aircraft.

16 Claims, 15 Drawing Sheets

AIRCRAFT PASSENGER WINDOW SHADE WITH ILLUMINATED IMAGE

BACKGROUND INFORMATION

1. Field

The present disclosure relates generally to aircraft and, in particular, to passenger window shades.

2. Background

Passenger window shades are a ubiquitous feature of modern passenger aircraft. Shades allow passengers to limit the amount of sunlight flowing through the window to improve their comfort and flight experience. Generally, the shades are generic and purely functional. However, they are found throughout the aircraft cabin and are highly visible. Therefore, passenger window shades offer another location on which the aircraft operator may further brand their airline or advertise a product or service.

Therefore, it would be desirable to have a method and apparatus that take into account at least some of the issues discussed above, as well as other possible issues.

SUMMARY

An embodiment of the present disclosure provides a passenger window shade on an aircraft. The passenger window shade comprises a first region having a first transmissivity for visible light and a second region situated within the first region. The second region has a second transmissivity for visible light that is different from the first transmissivity such that an image visible from inside the aircraft is formed on the passenger window shade when visible light is aimed at the passenger window shade from outside the aircraft.

Another embodiment of the present disclosure provides a method for fabricating a passenger window shade of an aircraft. A first region of the passenger window shade having a first transmissivity for visible light is formed. The first region has a first thickness. A second region of the passenger window shade is formed. The second region has a second thickness less than the first thickness and a second transmissivity for visible light that is different from the first transmissivity such that an image visible from inside the aircraft is formed on a first face of the passenger window shade when visible light is aimed at a second face of the passenger window shade from outside the aircraft.

Yet another embodiment of the present disclosure provides a method for fabricating a passenger window shade of an aircraft. A number of materials is vacuum formed to create a first region having a first transmissivity for visible light and a second region situated within the first region, the second region having a second transmissivity for visible light that is different from the first transmissivity such that an image visible from inside the aircraft is formed on the passenger window shade when visible light is aimed at the passenger window shade from outside the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account one or more different considerations. For example, the illustrative embodiments recognize and take into account that current window shades for passenger windows on aircraft are vacuum formed using both raw stock material and preformed details to create a shade assembly. The illustrative embodiments further recognize and take into account that preformed branding features using the same or similar materials could be introduced as separate details and co-formed with the raw stock material or the body of the shade.

The different illustrative embodiments recognize and take into account that available space in the cabin limits opportunities for airlines to share their brand or logo with customers. The different illustrative embodiments recognize and take into account that existing branding solutions in airplanes utilize large, flat, or sculptured panels which are electrically illuminated using airplane power. The different illustrative embodiments recognize and take into account that designing and certifying electrically-illuminated branding panels or features can be more costly or more time-consuming than desired. The illustrative examples recognize and take into account that current branding panels utilize mechanical attachments to other structure which involve stress analysis and materials testing to ensure they are certifiable and compatible with the mounting surface. Additionally, the illustrative embodiments recognize and take into account that locations of current branding features are generally limited to monument walls clustered around the passenger entry ways.

The illustrative examples present a passenger window shade with an image visible within the aircraft when visible light encounters the outboard surface of the passenger window shade. The illustrative examples enable multiple opportunities for an airline to display their logo without incurring the cost and complexity of electrically illuminated panels or signage. The illustrative examples increase the possible locations for airline branding in an aircraft. The illustrative examples provide an opportunity for branding or other images to be displayed at every seat row.

Figure 1:
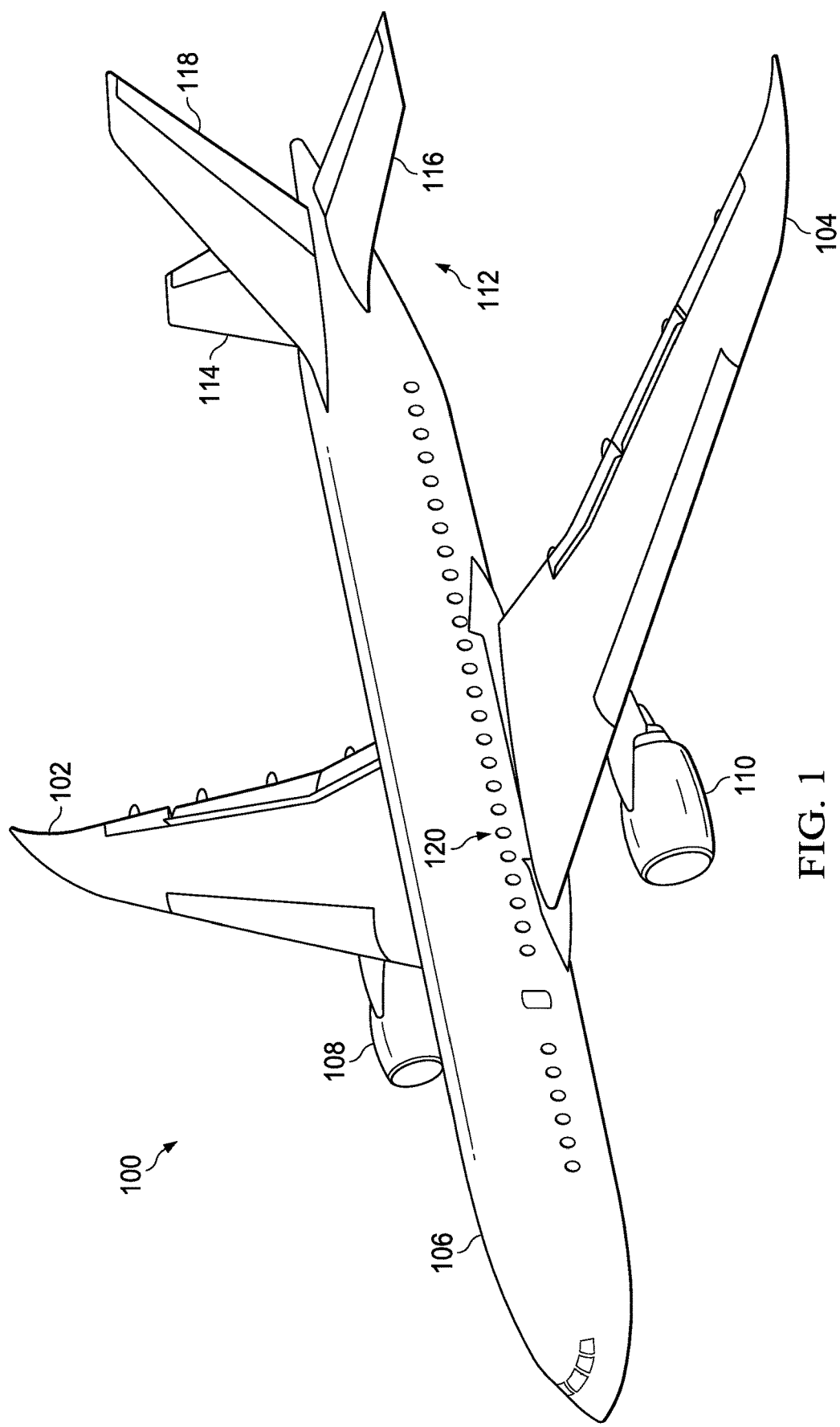
FIG. 1 is an illustration of an aircraft in which an illustrative embodiment may be implemented.

Referring now to the figures and, in particular, with reference to FIG. 1, an illustration of an aircraft is depicted in which an illustrative embodiment may be implemented. In this illustrative example, aircraft 100 has wing 102 and wing 104 connected to body 106. Aircraft 100 includes engine 108 connected to wing 102 and engine 110 connected to wing 104.

Body 106 has tail section 112. Horizontal stabilizer 114, horizontal stabilizer 116, and vertical stabilizer 118 are connected to tail section 112 of body 106. Aircraft 100 is an example of an aircraft in which the disclosed passenger window shades may be implemented.

Body 106 of aircraft 100 has passenger windows 120. A passenger window shade of the illustrative examples can be present in any of passenger windows 120.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Figure 2:
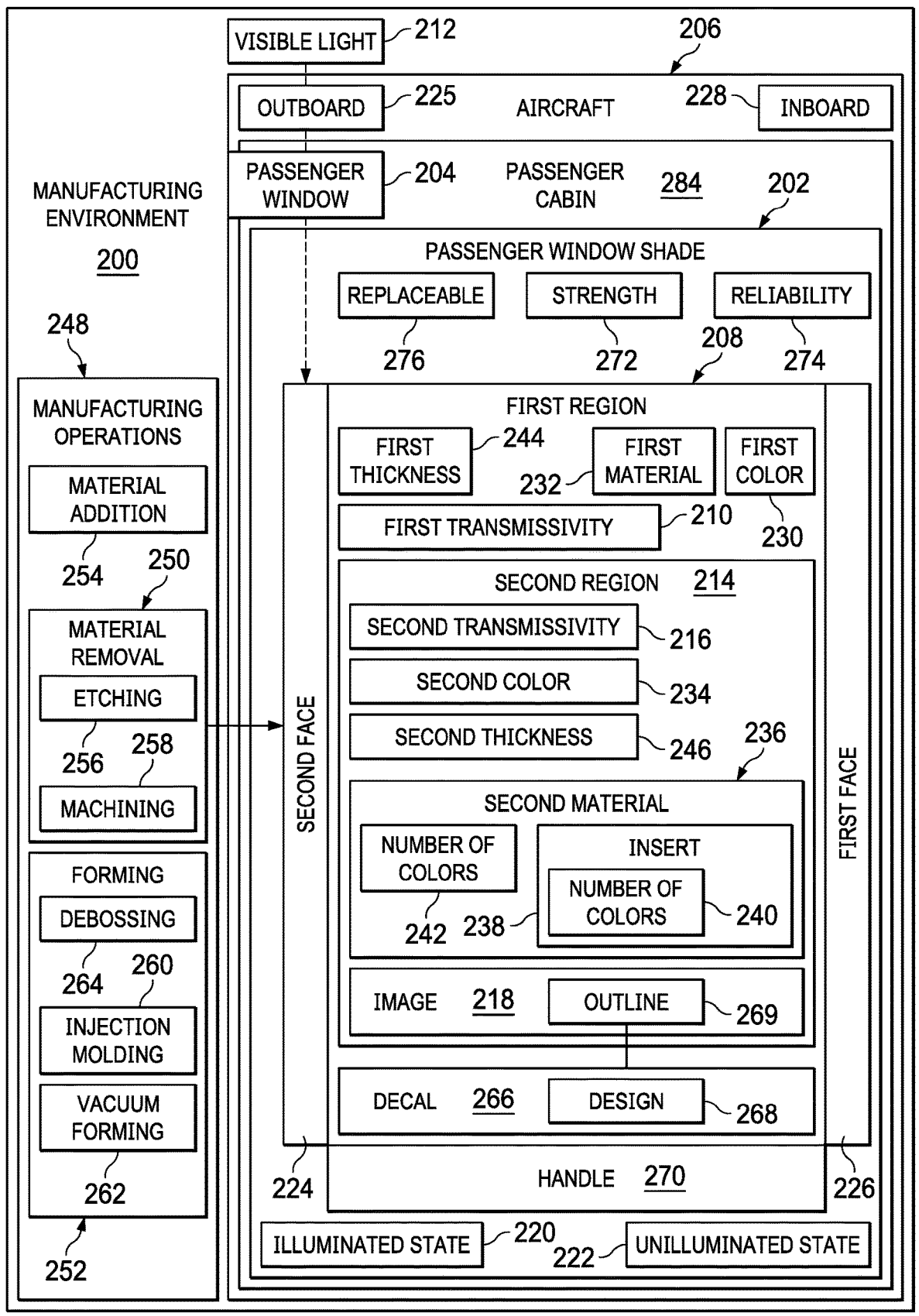
FIG. 2 is an illustration of a block diagram of a manufacturing environment in which an illustrative embodiment may be implemented.

Turning now to FIG. 2, an illustration of a block diagram of a manufacturing environment is depicted in which an illustrative embodiment may be implemented. Manufacturing environment 200 is an environment in which passenger window shade 202 is manufactured. Passenger window shade 202 is present in passenger window 204 of aircraft 206.

Passenger window shade 202 has first region 208 having first transmissivity 210 for visible light 212 and second region 214 situated within first region 208. Second region 214 has second transmissivity 216 for visible light 212 that is different from first transmissivity 210 such that image 218 visible from inside aircraft 206 is formed on passenger window shade 202 when visible light 212 is aimed at passenger window shade 202 from outside aircraft 206.

Image 218 is visible in illuminated state 220. Image 218 is not visible in unilluminated state 222. Passenger window shade 202 is in illuminated state 220 when visible light 212 is directed at second face 224 of passenger window shade 202. Second face 224 is outboard 225 relative to portions of aircraft 206. Second face 224 faces outside of aircraft 206. Passenger window shade 202 is in illuminated state 220 when visible light 212 is sufficient to travel through at least one of first region 208 with first transmissivity 210 or second region 214 with second transmissivity 216.

Image 218 takes any desirable form. Image 218 can be any of text, an icon, a logo, an illustration, an outline, or any other desirable type of image. In some illustrative examples, image 218 takes the form of a branding feature within aircraft 206. In some illustrative examples, image 218 is described as a non-electric illuminated branding feature. Image 218 is created by second transmissivity 216 of second region 214. In some illustrative examples, second transmissivity 216 of second region 214 is greater than first transmissivity 210 of first region 208. In other illustrative examples, first transmissivity 210 of first region 208 is greater than second transmissivity 216 of second region 214.

When second transmissivity 216 is greater than first transmissivity 210, image 218 is an illuminated image. Image 218 may also be referred to as an "illuminated image." Image 218 appears to be lit, or illuminated, by visible light 212 from outside aircraft 206. An illuminated image is one that is lighter than surrounding material when passenger window shade 202 is in illuminated state 220. When first transmissivity 210 is greater than second transmissivity 216, image 218 is darker than first region 208 in illuminated state 220.

In some illustrative examples, in unilluminated state 222, first region 208 and second region 214 appear substantially similar on first face 226. In these illustrative examples, in unilluminated state 222, first region 208 and second region 214 have substantially the same texture and substantially the same color on first face 226. When first region 208 and second region 214 appear substantially similar on first face 226, first region 208 and second region 214 can be indistinguishable in unilluminated state 222.

In some other illustrative examples, first region 208 and second region 214 are distinguishable in unilluminated state 222. In these illustrative examples, at least one of color or texture is different between first region 208 and second region 214.

First region 208 has first color 230 on first face 226. In unilluminated state 222, first color 230 is provided by first material 232 exposed on first face 226 of passenger window shade 202. First material 232 of first region 208 can be homogenous or heterogeneous. In some illustrative examples, first material 232 is a bulk material. In some illustrative examples, first material 232 includes multiple layers of materials.

In some illustrative examples, first color 230 is provided by a facesheet or other coating provided for aesthetics. In some illustrative examples, first color 230 is provided by a bulk material forming first region 208.

Second region 214 has second color 234 on first face 226. In unilluminated state 222, second color 234 is provided by second material 236 exposed on first face 226 of passenger window shade 202. Second material 236 of second region 214 can be homogenous or heterogeneous. In some illustrative examples, second material 236 is a bulk material. In some illustrative examples, second material 236 includes layers of materials.

In some illustrative examples, second color 234 stays substantially the same between illuminated state 220 and unilluminated state 222. In some illustrative examples, second color 234 changes between illuminated state 220 and unilluminated state 222. Second color 234 of second region 214 includes any desirable quantity of colors. In some illustrative examples, second color 234 is one color. In some illustrative examples, second color 234 is more than one color.

In some illustrative examples, second region 214 includes insert 238 configured to change second color 234 between illuminated state 220 and unilluminated state 222. In some illustrative examples, insert 238 in second material 236 between first face 226 and second face 224 has number of colors 240 different than number of colors 242 of second material 236 exposed on first face 226.

In some of these illustrative examples, insert 238 is not visible in unilluminated state 222. In these illustrative examples, number of colors 240 of insert 238 is visible in illuminated state 220.

Transmissivity is affected by a thickness and a material of a region. First region 208 has first thickness 244 and first material 232. Changing either first thickness 244 or first material 232 changes first transmissivity 210 of first region 208. Second region 214 has second thickness 246 and second material 236.

In some illustrative examples, first region 208 and second region 214 comprise different materials. In these illustrative examples, first transmissivity 210 is different from second transmissivity 216 due to at least first region 208 and second region 214 comprising different materials. In these illustrative examples, first material 232 is different from second material 236. In these illustrative examples, first transmissivity 210 is different from second transmissivity 216 due to at least first material 232 being different from second material 236.

In some illustrative examples, first thickness 244 and second thickness 246 comprise different thicknesses. In these illustrative examples, first transmissivity 210 is different from second transmissivity 216 due to at least first thickness 244 and second thickness 246 comprising different thicknesses.

Manufacturing operations 248 can be performed in manufacturing environment 200. Any desirable manufacturing operation may be performed to produce first thickness 244 and second thickness 246 having different values. Manufacturing operations 248 include material removal 250, forming 252, and material addition 254. Any of material removal 250, forming 252, or material addition 254 can be used to cause first thickness 244 to be different from second thickness 246.

In some illustrative examples, material addition 254 is used to make first thickness 244 different from second thickness 246. In some illustrative examples, material addition 254 is performed on second face 224 in first region 208 to increase first thickness 244 and first transmissivity 210. Material addition 254 takes place following forming 252 of passenger window shade 202.

In some illustrative examples, material removal 250 is used to make first thickness 244 different from second thickness 246. In some illustrative examples, material removal 250 is performed on second face 224 in second region 214 to reduce second thickness 246 and second transmissivity 216. Material removal 250 takes any desirable form. In some illustrative examples, material removal 250 is selected from etching 256 or machining 258. Material removal 250 takes place following forming 252 of passenger window shade 202.

In some illustrative examples, forming 252 of passenger window shade 202 results in first thickness 244 and second thickness 246 having different thicknesses. In some illustrative examples, forming 252 is selected from one of injection molding 260, vacuum forming 262, or any other desirable material forming process. Injection molding 260 or vacuum forming 262 can be used to form first region 208 having first thickness 244 different from second thickness 246 of second region 214. Injection molding 260 or vacuum forming 262 can form first region 208 and second region 214 having different thicknesses due to at least one of tooling design or thickness of material provided to forming 252. In some illustrative examples, debossing 264 is performed on passenger window shade 202 to form second thickness 246. In some illustrative examples, second region 214 is formed through debossing 264 into passenger window shade 202. In some illustrative examples, debossing 264 is performed during other forming processes such as injection molding 260 or vacuum forming 262. In other illustrative examples, debossing 264 is performed after injection molding 260 or vacuum forming 262.

In some illustrative examples, first thickness 244 and second thickness 246 are substantially the same. In these illustrative examples, first material 232 and second material 236 are different. In some illustrative examples, when first material 232 and second material 236 are different, a plurality of materials is provided to tooling to perform forming 252.

In some illustrative examples, first region 208 and second region 214 comprise at least two different colors. In one illustrative example, first color 230 of first region 208 and second color 234 of second region 214 are different in unilluminated state 222. In another illustrative example, first color 230 of first region 208 and second color 234 of second region 214 are substantially the same in unilluminated state 222 and different in illuminated state 220. In these illustrative examples, passage of visible light 212 into second region 214 changes second color 234. In some illustrative examples, first region 208 and second region 214 comprise at least two different colors due to insert 238 in second region 214.

In some illustrative examples, passenger window shade 202 has decal 266 attached to second material 236 of second region 214. Decal 266 has design 268. Design 268 takes any desirable form. Design 268 can be any of text, an icon, an illustration, an outline, or any other desirable type of design.

In some illustrative examples, in illuminated state 220, image 218 forms outline 269 for design 268 of decal 266. In some illustrative examples, outline 269 follows design 268. In one illustrative example, outline 269 follows the outer boundaries of design 268. In other illustrative examples, outline 269 has a geometry different from design 268 that surrounds design 268. For example, outline 269 may be selected from one of a circle, an oval, a square, a rectangle, a triangle, or any other desirable shape surrounding design 268.

In some illustrative examples, image 218 provides color to design 268 of decal 266 when illuminated. In these illustrative examples, image 218 has number of colors 240 from insert 238.

Passenger window shade 202 has handle 270. Handle 270 is used to lift or lower passenger window shade 202 relative to passenger window 204.

Passenger window shade 202 is designed to have sufficient strength 272 and sufficient reliability 274 for repeated use in passenger cabin 284 of aircraft 206. First thickness 244, first material 232, second thickness 246, and second material 236 are selected such that strength 272 and reliability 274 of passenger window shade 202 are not undesirably affected. In some illustrative examples, strength 272 and reliability 274 of passenger window shade 202 are substantially the same as the strength and reliability of conventional passenger window shades.

Passenger window shade 202 is replaceable 276. Passenger window shade 202 can be removed and replaced with a passenger window shade having substantially the same size and shape. In some illustrative examples, passenger window shade 202 can be removed and replaced with a passenger window shade having a same image as image 218 in the respective second region. In some illustrative examples, passenger window shade 202 can be removed and replaced with a passenger window shade having a different image than image 218 in the respective second region. Passenger window shade 202 can be replaced due to wear or to update imaging within aircraft 206.

The illustrations of passenger window shade 202 and manufacturing environment 200 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, insert 238 may not be present in second region 214. As another example, decal 266 may not be present on second region 214.

Figure 3:
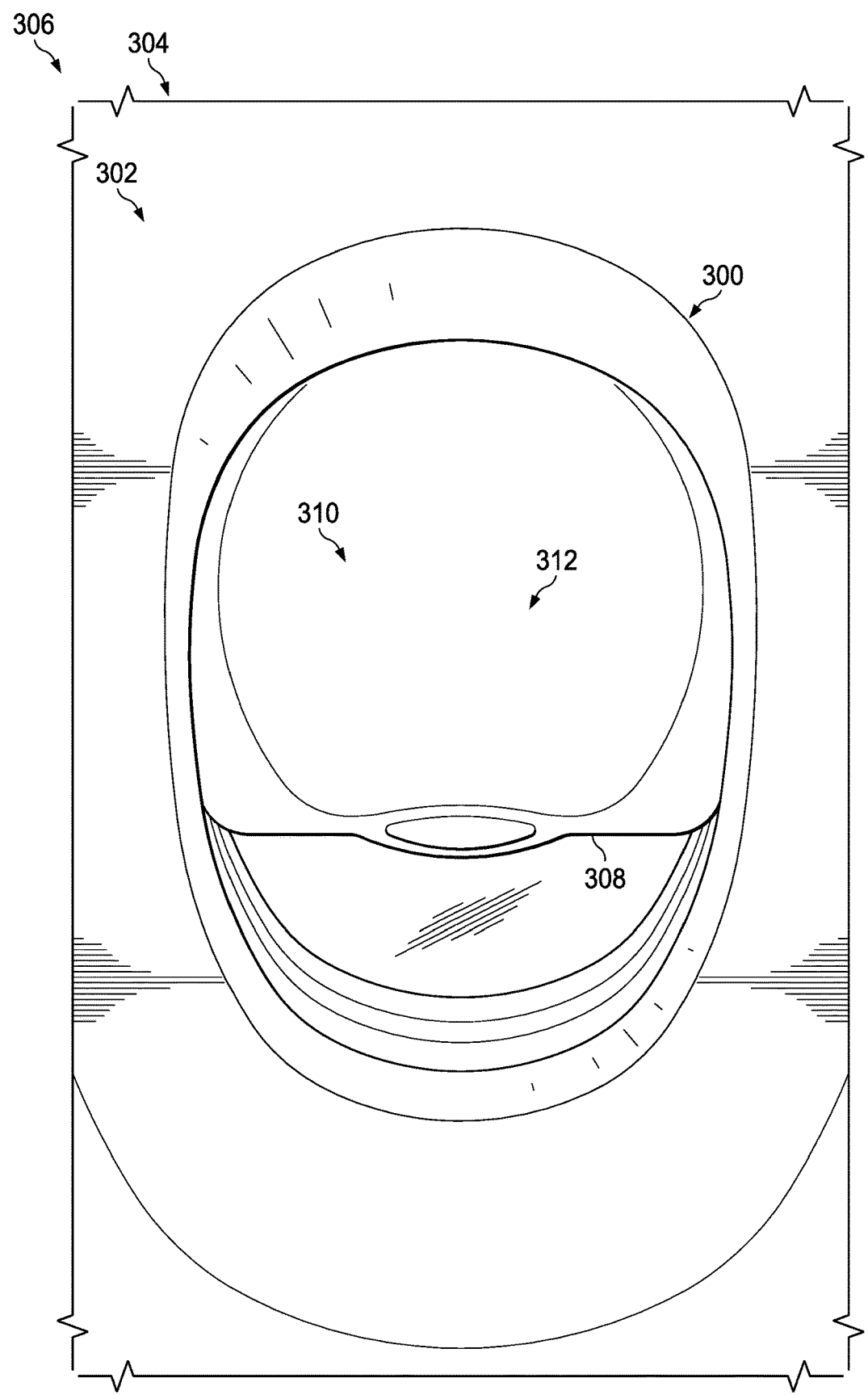
FIG. 3 is an illustration of an inboard view of a passenger window with a passenger window shade in accordance with an illustrative embodiment.

Turning now to FIG. 3, an illustration of an inboard view of a passenger window with a passenger window shade is depicted in accordance with an illustrative embodiment. Passenger window 300 is a physical implementation of passenger window 204 of FIG. 2. Passenger window 300 is present within passenger cabin 302 of aircraft 304. In view 306 of passenger window 300, passenger window shade 308 is in unilluminated state 310. In unilluminated state 310, first face 312 appears uniform in color. Passenger window shade 308 is a physical implementation of passenger window shade 202 of FIG. 2.

Figure 4:
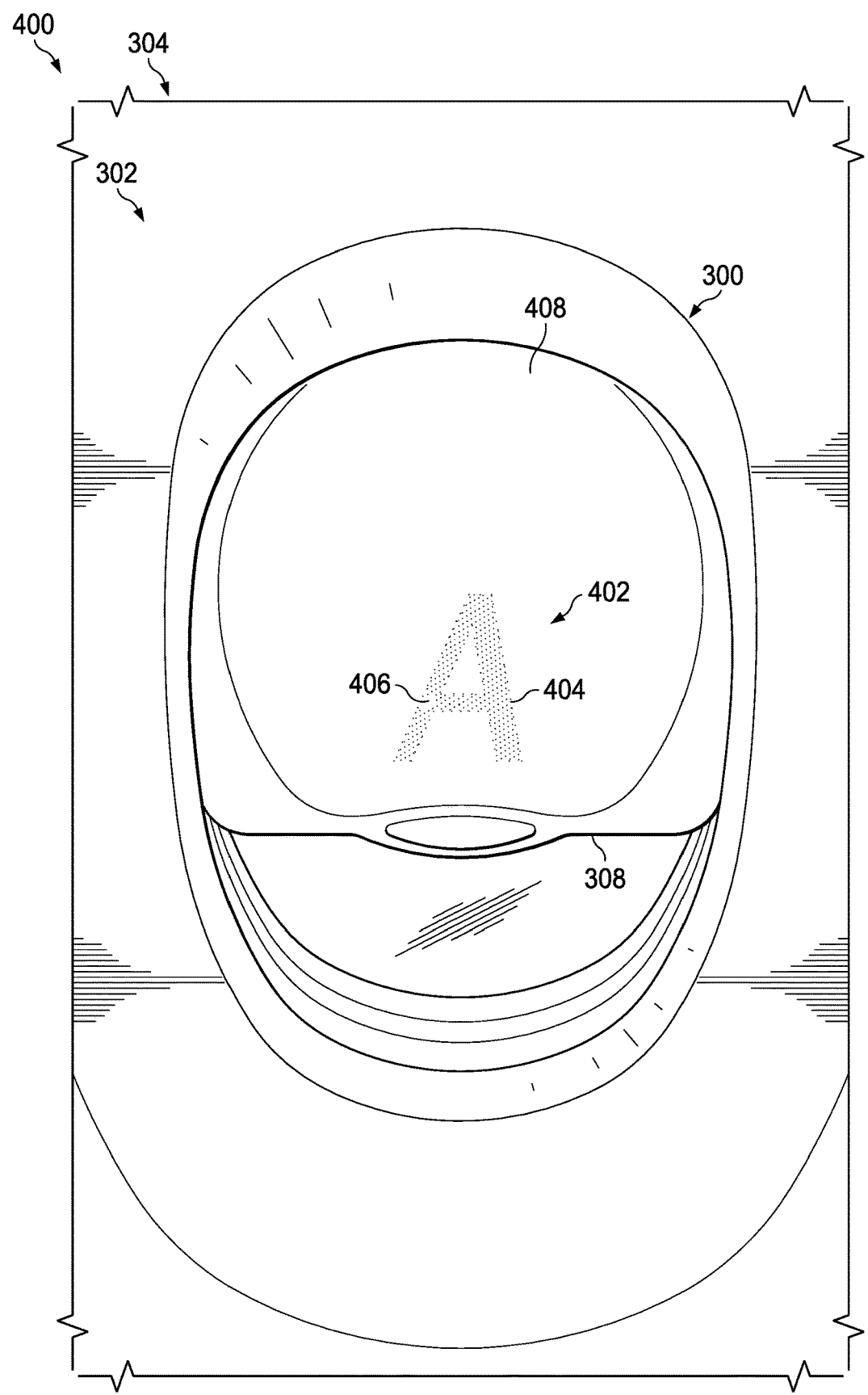
FIG. 4 is an illustration of an inboard view of a passenger window with a passenger window shade where visible light is aimed at the passenger window shade from outside the aircraft in accordance with an illustrative embodiment.

Turning now to FIG. 4, an illustration of an inboard view of a passenger window with a passenger window shade where visible light is aimed at the passenger window shade from outside the aircraft is depicted in accordance with an illustrative embodiment. View 400 is a view of passenger window 300 when passenger window shade 308 is in illuminated state 402. In illuminated state 402, visible light is aimed at passenger window shade 308 from outside aircraft 304.

In illuminated state 402, image 404 is visible from inside aircraft 304. Image 404 is formed on passenger window shade 308 when the visible light is aimed at passenger window shade 308 from outside aircraft 304. In some illustrative examples, image 404 is an illuminated image.

Image 404 is formed in second region 406 when visible light encounters a second face (not visible) of passenger window shade 308. Second region 406 has a second transmissivity for the visible light. Second region 406 is situated within first region 408. First region 408 has a first transmissivity for the visible light different from the second transmissivity of second region 406. In this illustrative example, the first transmissivity of first region 408 is less than the second transmissivity of second region 406.

Figure 5:
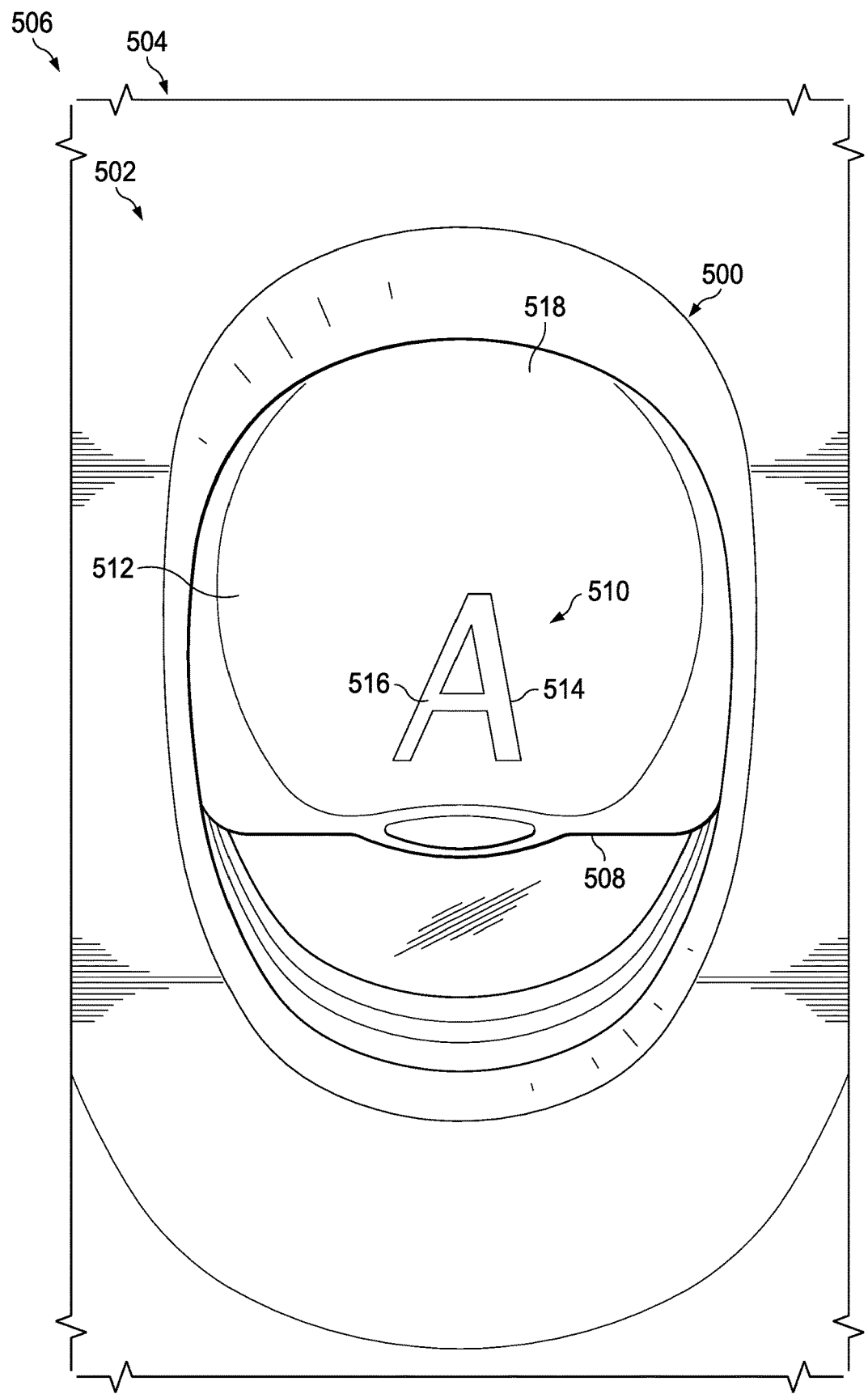
FIG. 5 is an illustration of an inboard view of a passenger window with a passenger window shade in accordance with an illustrative embodiment.

Turning now to FIG. 5, an illustration of an inboard view of a passenger window with a passenger window shade is depicted in accordance with an illustrative embodiment. Passenger window 500 is a physical implementation of passenger window 204 of FIG. 2. Passenger window 500 is present within passenger cabin 502 of aircraft 504. In view 506 of passenger window 500, passenger window shade 508 is in unilluminated state 510. In unilluminated state 510, first face 512 has design 514. Passenger window shade 508 is a physical implementation of passenger window shade 202 of FIG. 2.

Design 514 is present on first face 512 of passenger window shade 508. Design 514 is present in second region 516. Second region 516 is situated within first region 518. Design 514 is visible in unilluminated state 510.

Figure 6:
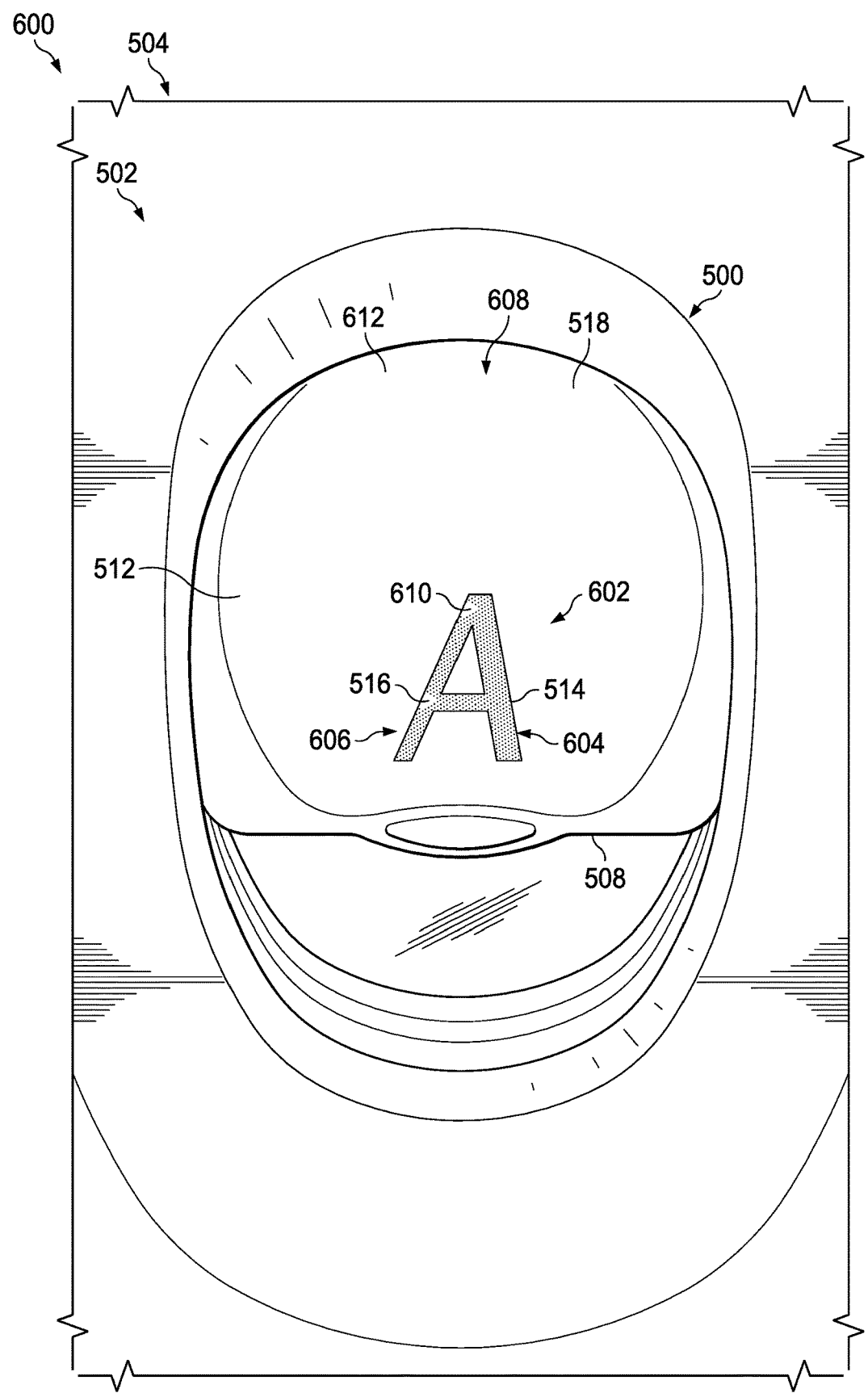
FIG. 6 is an illustration of an inboard view of a passenger window with a passenger window shade where visible light is aimed at the passenger window shade from outside the aircraft in accordance with an illustrative embodiment.

Turning now to FIG. 6, an illustration of an inboard view of a passenger window with a passenger window shade where visible light is aimed at the passenger window shade from outside the aircraft is depicted in accordance with an illustrative embodiment. View 600 is a view of passenger window 500 when passenger window shade 508 is in illuminated state 602. In illuminated state 602, visible light is aimed at passenger window shade 508 from outside aircraft 504.

In illuminated state 602, image 604 is visible from inside aircraft 504. Image 604 is formed on passenger window shade 508 when the visible light is aimed at passenger window shade 508 from outside aircraft 504. In some illustrative examples, image 604 is an illuminated image.

Image 604 is formed in second region 516 when the visible light encounters a second face (not visible) of passenger window shade 508. Second region 516 has a second transmissivity for the visible light. First region 518 has a first transmissivity for the visible light different from the second transmissivity of second region 516. In this illustrative example, the first transmissivity of first region 518 is less than the second transmissivity of second region 516.

In this illustrative example, image 604 has number of colors 606. Number of colors 606 is not visible inside aircraft 504 in unilluminated state 510. Number of colors 606 is different from first color 608 of first region 518 in illuminated state 602. Number of colors 606 is formed by visible light passing through second material 610 of second region 516. In this illustrative example, second material 610 is different from first material 612 of first region 518. Image 604 provides number of colors 606 to design 514 in illuminated state 602.

Figure 7:
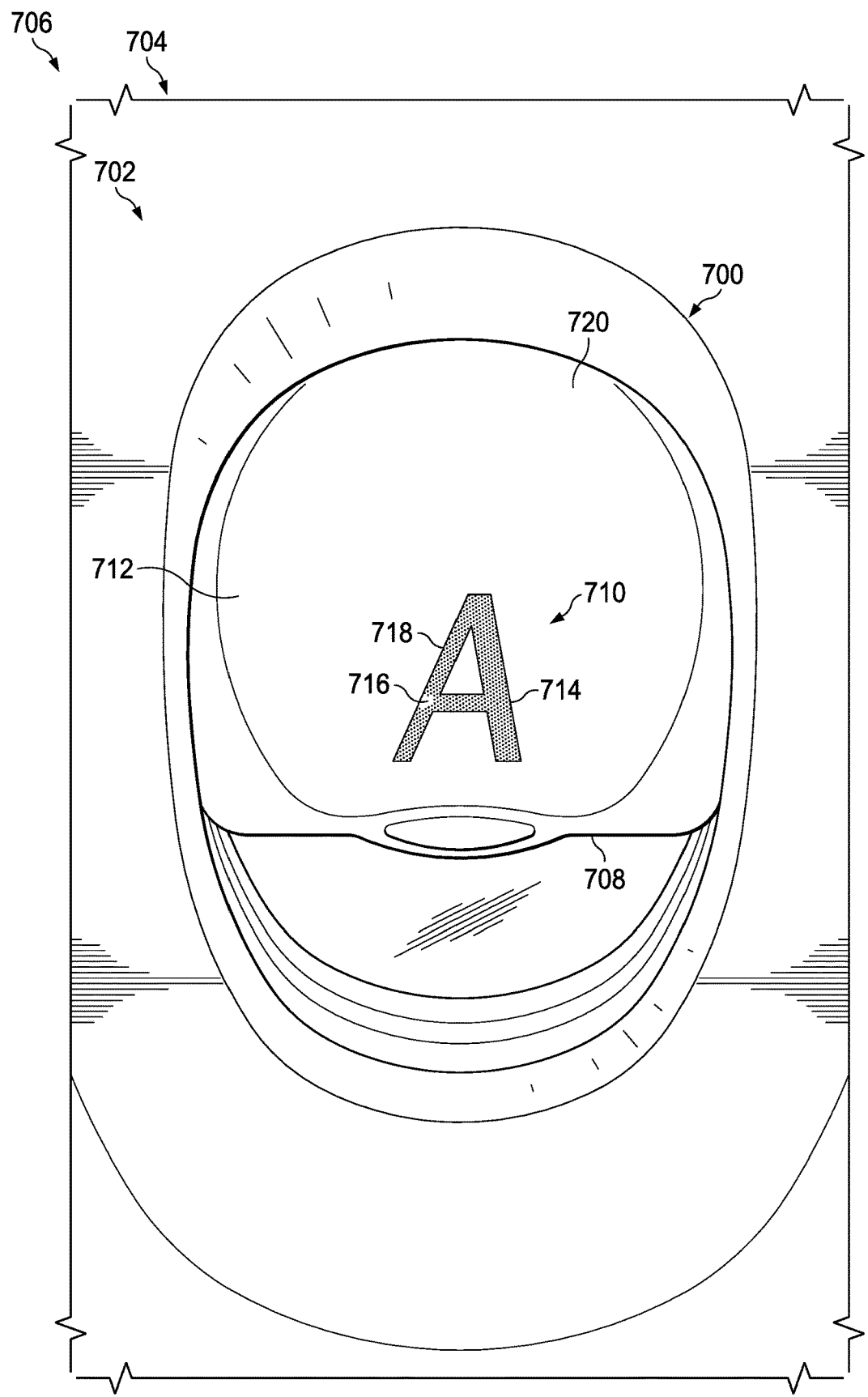
FIG. 7 is an illustration of an inboard view of a passenger window with a passenger window shade in accordance with an illustrative embodiment.

Turning now to FIG. 7, an illustration of an inboard view of a passenger window with a passenger window shade is depicted in accordance with an illustrative embodiment. Passenger window 700 is a physical implementation of passenger window 204 of FIG. 2. Passenger window 700 is present within passenger cabin 702 of aircraft 704. In view 706 of passenger window 700, passenger window shade 708 is in unilluminated state 710. In unilluminated state 710, first face 712 has design 714. In this illustrative example, design 714 is part of decal 716 on first face 712 of passenger window shade 708. Passenger window shade 708 is a physical implementation of passenger window shade 202 of FIG. 2.

Design 714 is present on first face 712 of passenger window shade 708. Design 714 is present in second region 718. Second region 718 is situated within first region 720. Design 714 is visible in unilluminated state 710.

Figure 8:
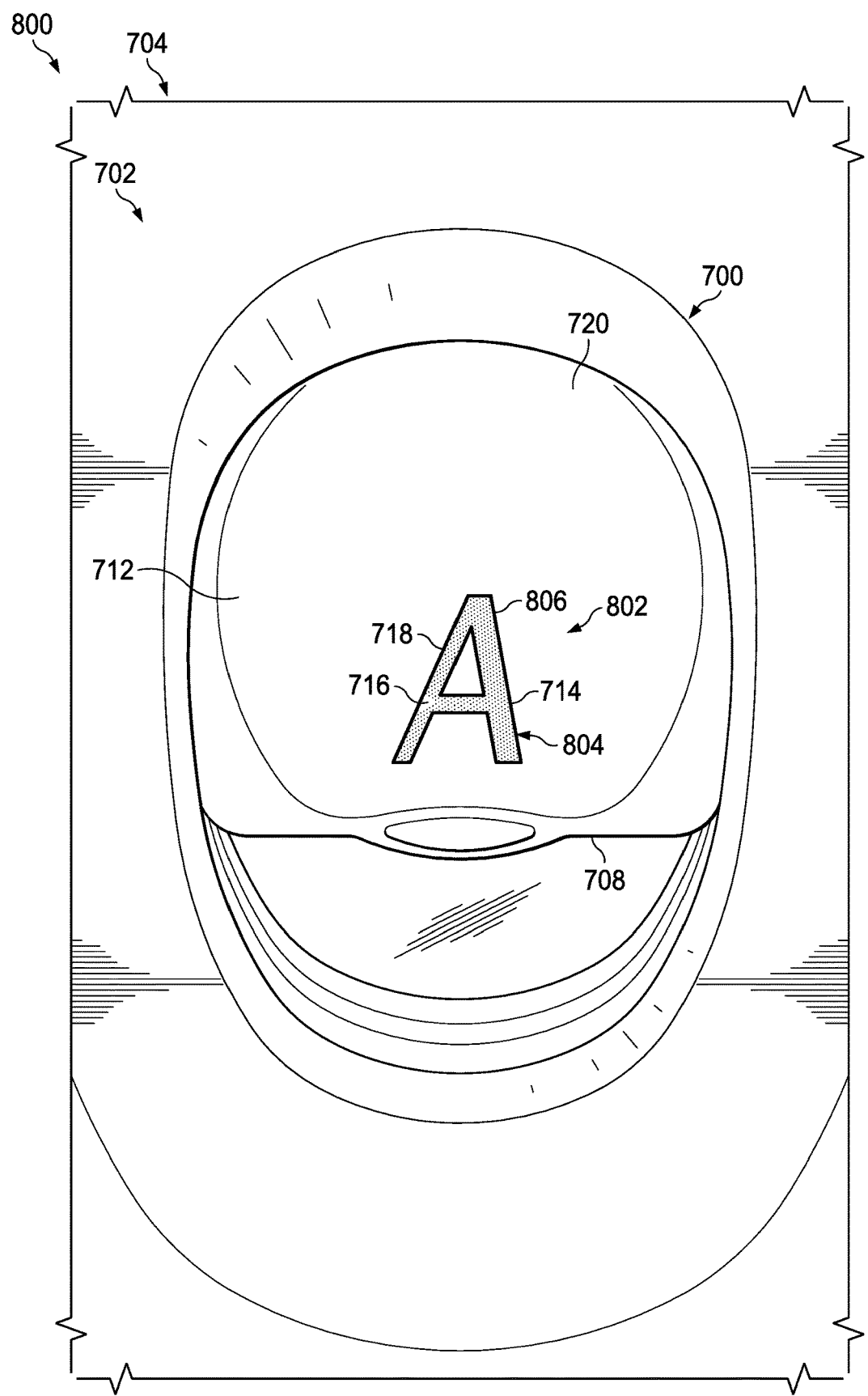
FIG. 8 is an illustration of an inboard view of a passenger window with a passenger window shade where visible light is aimed at the passenger window shade from outside the aircraft in accordance with an illustrative embodiment.

Turning now to FIG. 8, an illustration of an inboard view of a passenger window with a passenger window shade where visible light is aimed at the passenger window shade from outside the aircraft is depicted in accordance with an illustrative embodiment. View 800 is a view of passenger window 700 when passenger window shade 708 is in illuminated state 802. In illuminated state 802, visible light is aimed at passenger window shade 708 from outside aircraft 704.

In illuminated state 802, image 804 is visible from inside aircraft 704. Image 804 is formed on passenger window shade 708 when the visible light is aimed at passenger window shade 708 from outside aircraft 704. In some illustrative examples, image 804 is an illuminated image.

Image 804 is formed in second region 718 when the visible light encounters a second face (not visible) of passenger window shade 708. Second region 718 has a second transmissivity for the visible light. First region 720 has a first transmissivity for the visible light different from the second transmissivity of second region 718. In this illustrative example, the first transmissivity of first region 720 is less than the second transmissivity of second region 718.

In this illustrative example, image 804 creates outline 806. Outline 806 is not visible inside aircraft 704 in unilluminated state 710. Outline 806 is an outline of design 714. Outline 806 provides visual interest to design 714.

Figure 9:
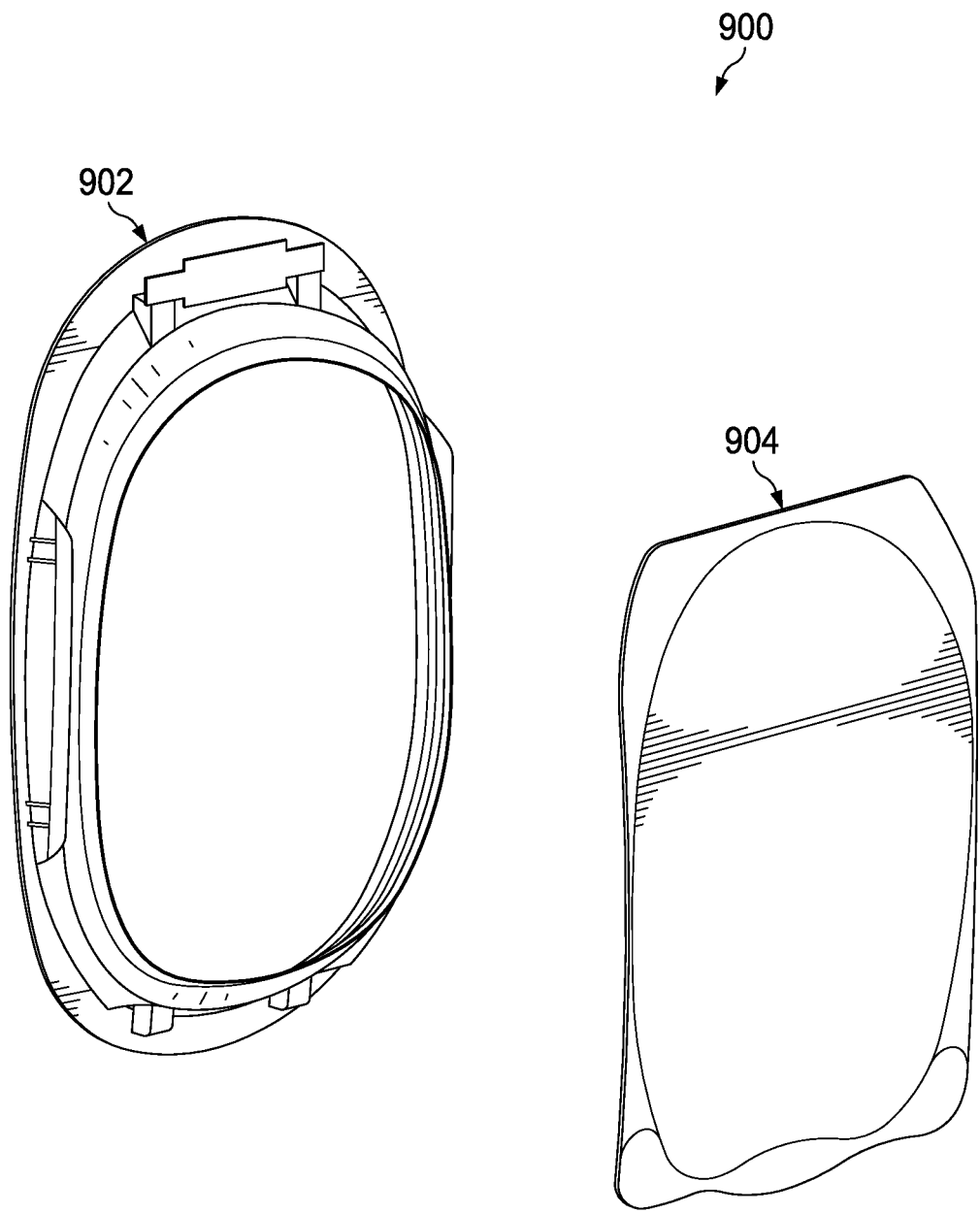
FIG. 9 is an illustration of an exploded view of a passenger window with a passenger window shade in accordance with an illustrative embodiment.

Turning now to FIG. 9, an illustration of an exploded view of a passenger window with a passenger window shade is depicted in accordance with an illustrative embodiment. In view 900, passenger window 902 and passenger window shade 904 are visible. During maintenance, passenger window shade 904 can be removed and replaced with another passenger window shade having substantially the same dimensions. In some illustrative examples, passenger window shade 904 can be removed from passenger window 902 and replaced with a passenger window shade having a different image when visible light is directed at the replacement passenger window shade.

Figure 10:
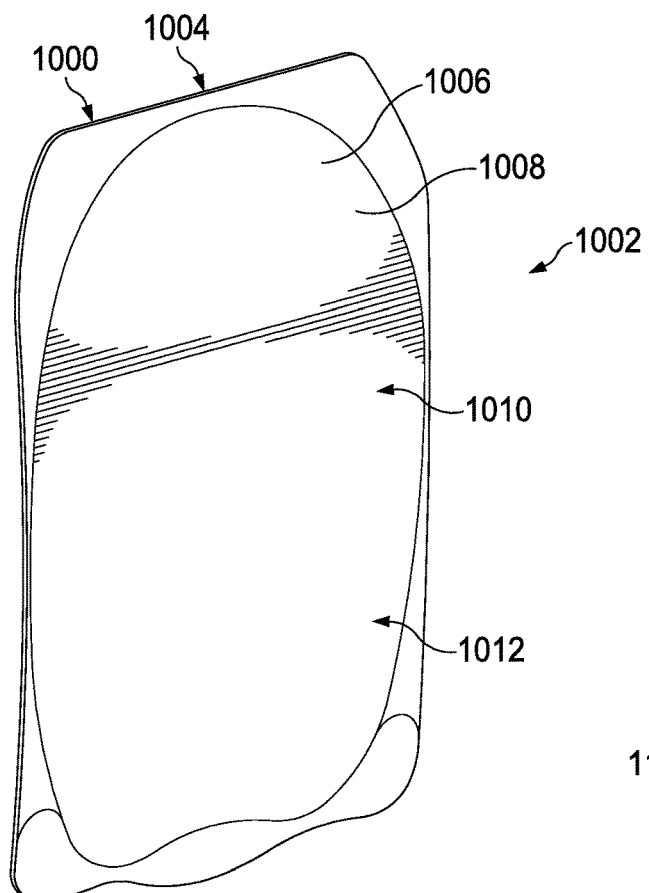
FIG. 10 is an illustration of a view of a first face of a passenger window shade in accordance with an illustrative embodiment.

Turning now to FIG. 10, an illustration of a view of a first face of a passenger window shade is depicted in accordance with an illustrative embodiment. Passenger window shade 1000 is a physical implementation of passenger window shade 202 of FIG. 2. In view 1002 of passenger window shade 1000, passenger window shade 1000 is in unilluminated state 1004. In unilluminated state 1004, first face 1006 has homogenous surface 1008. Homogenous surface 1008 has a substantially constant texture and substantially constant color across first face 1006.

Passenger window shade 1000 has first region 1010 and second region 1012. Second region 1012 is situated within first region 1010. In this illustrative example, second region 1012 is not visibly distinguishable from first region 1010 in unilluminated state 1004.

Figure 11:
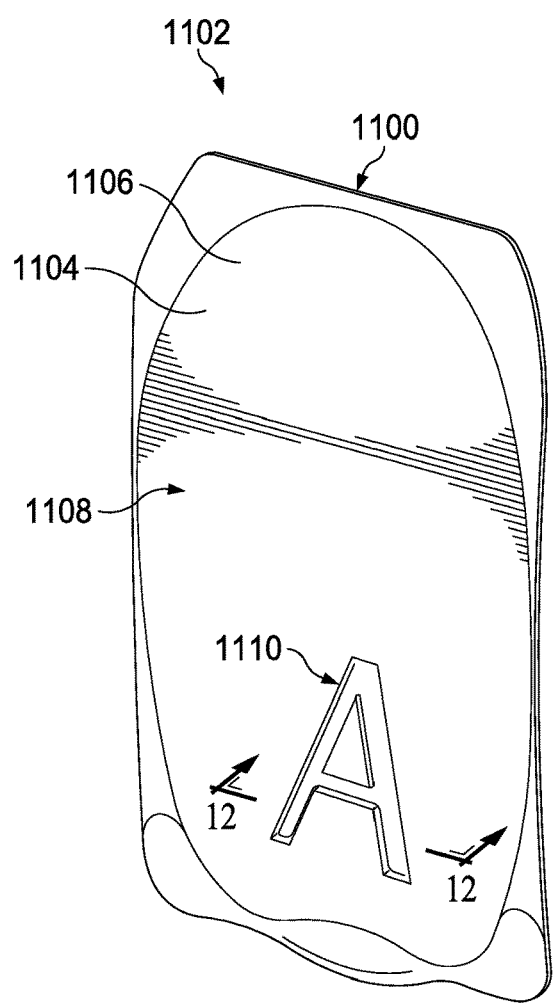
FIG. 11 is an illustration of a view of a second face of a passenger window shade in accordance with an illustrative embodiment.

Turning now to FIG. 11, an illustration of a view of a second face of a passenger window shade is depicted in accordance with an illustrative embodiment. Passenger window shade 1100 is a physical implementation of passenger window shade 202 of FIG. 2. In some illustrative examples, passenger window shade 1100 is the same as passenger window shade 1000 of FIG. 10. In view 1102 of passenger window shade 1100, second face 1104 has varying surface topography 1106. Varying surface topography 1106 is created by varying thicknesses of passenger window shade 1100.

Passenger window shade 1100 has first region 1108 and second region 1110. Second region 1110 is situated within first region 1108. In this illustrative example, second region 1110 has a thickness different than first region 1108. In this illustrative example, second region 1110 is thinner than first region 1108. In this illustrative example, first region 1108 and second region 1110 are formed of a same material. In this illustrative example, first region 1108 and second region 1110 have different transmissivities due to having different thicknesses. In this illustrative example, first region 1108 and second region 1110 are visibly distinct from each other on second face 1104.

Figure 12:
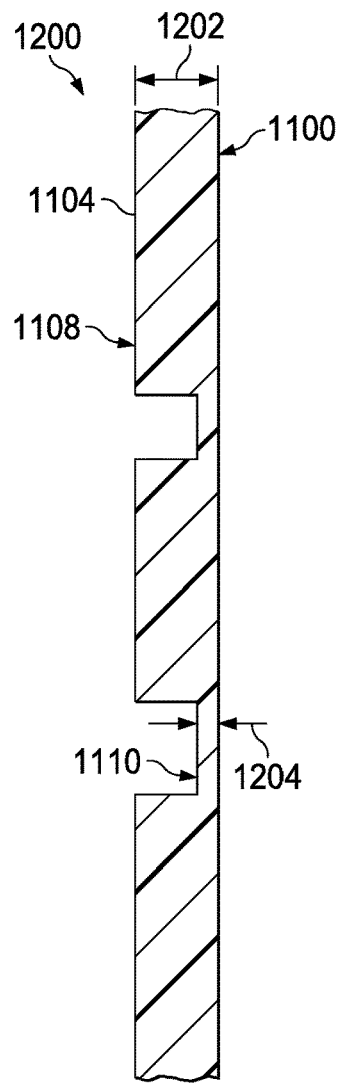
FIG. 12 is an illustration of a cross-sectional view of a passenger window shade in accordance with an illustrative embodiment.

Turning now to FIG. 12, an illustration of a cross-sectional view of a passenger window shade is depicted in accordance with an illustrative embodiment. View 1200 is a cross-sectional view of passenger window shade 1100. In view 1200, first thickness 1202 of first region 1108 and second thickness 1204 of second region 1110 are visible. In this illustrative example, first region 1108 and second region 1110 are formed of a same material. In this illustrative example, first region 1108 and second region 1110 have different transmissivities due to having different thicknesses.

In this illustrative example, first thickness 1202 is greater than second thickness 1204. First thickness 1202 produces a first transmissivity to visible light in first region 1108 less than a second transmissivity to visible light in second region 1110 produced by second thickness 1204.

Figure 13:
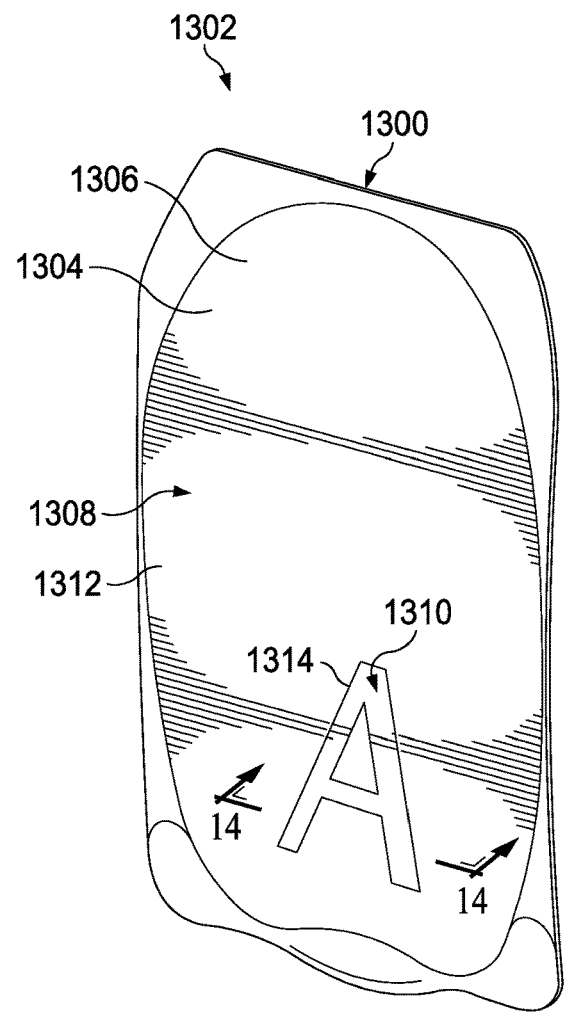
FIG. 13 is an illustration of a view of a second face of a passenger window shade in accordance with an illustrative embodiment.

Turning now to FIG. 13, an illustration of a view of a second face of a passenger window shade is depicted in accordance with an illustrative embodiment. Passenger window shade 1300 is a physical implementation of passenger window shade 202 of FIG. 2. In some illustrative examples, passenger window shade 1300 is the same as passenger window shade 1000 of FIG. 10. In view 1302 of passenger window shade 1300, second face 1304 has continuous surface 1306. Continuous surface 1306 does not have varying surface topography.

Passenger window shade 1300 has first region 1308 and second region 1310. Second region 1310 is situated within first region 1308. In this illustrative example, second region 1310 is formed from a material different than first region 1308. In some illustrative examples, first region 1308 and second region 1310 have at least one of a different texture or a different color than the other.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

In some illustrative examples, first region 1308 and second region 1310 are visibly distinct from each other. In some illustrative examples, first region 1308 and second region 1310 are not visibly distinct from each other. In this illustrative example, first region 1308 and second region 1310 have different transmissivities due to having different materials.

First region 1308 includes first material 1312. Second region 1310 includes second material 1314.

Figure 14:
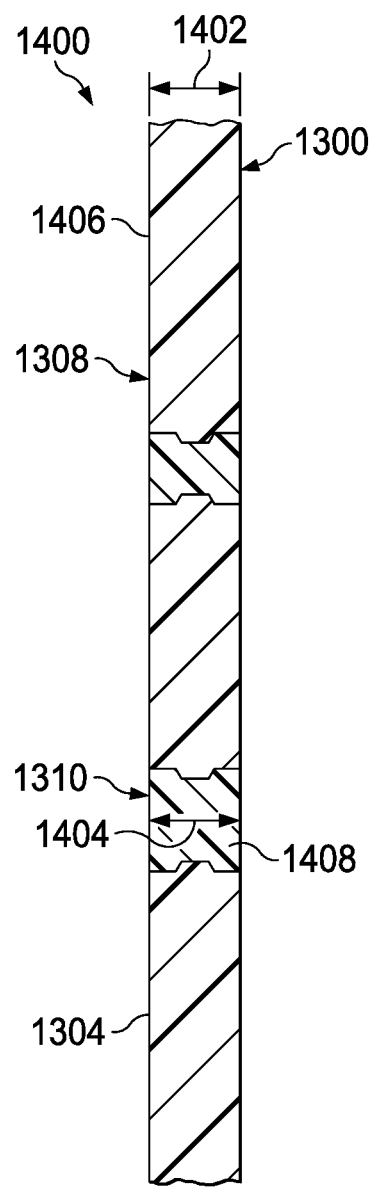
FIG. 14 is an illustration of a cross-sectional view of a passenger window shade in accordance with an illustrative embodiment.

Turning now to FIG. 14, an illustration of a cross-sectional view of a passenger window shade is depicted in accordance with an illustrative embodiment. View 1400 is a cross-sectional view of passenger window shade 1300. In view 1400, first thickness 1402 of first region 1308 and second thickness 1404 of second region 1310 are visible. In this illustrative example, first thickness 1402 and second thickness 1404 are substantially the same.

In this illustrative example, first region 1308 and second region 1310 are formed of different materials. First region 1308 includes first material 1406. Second region 1310 includes second material 1408. In this illustrative example, first region 1308 and second region 1310 have different transmissivities due to having different materials.

First material 1406 produces a first transmissivity to visible light in first region 1308 less than a second transmissivity to the visible light in second region 1310 produced by second material 1408. Although each of first region 1308 and second region 1310 are depicted as having a single material, in some illustrative examples, at least one of first region 1308 or second region 1310 is formed of more than one material.

Figure 15:
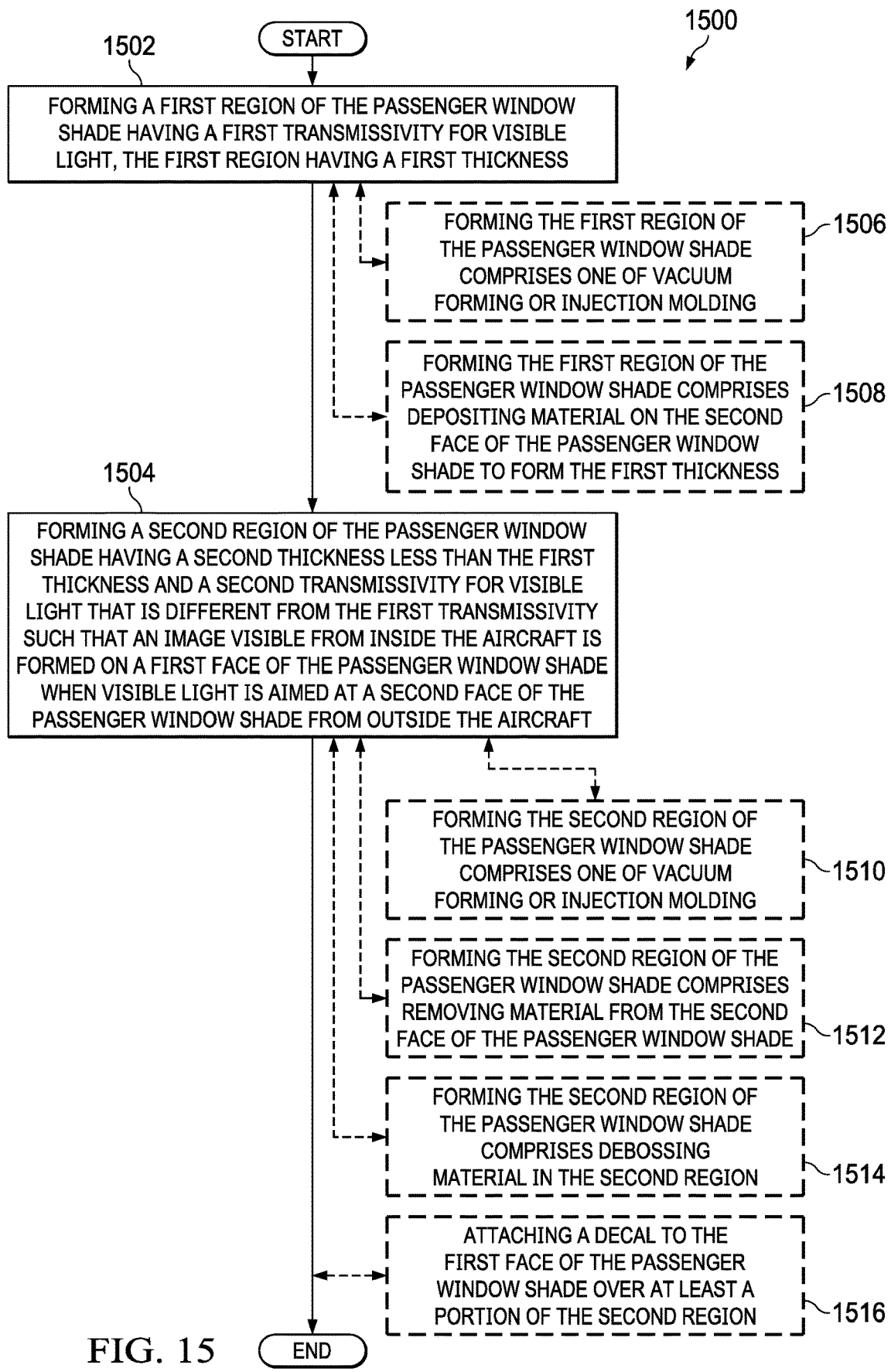
FIG. 15 is an illustration of a flowchart of a method of fabricating a passenger window shade of an aircraft in accordance with an illustrative embodiment.

Turning now to FIG. 15, an illustration of a flowchart of a method of fabricating a passenger window shade of an aircraft is depicted in accordance with an illustrative embodiment. Method 1500 can be used to fabricate a passenger window shade present in aircraft 100 of FIG. 1. Method 1500 can be used to fabricate passenger window shade 202 of FIG. 2. Method 1500 can be used to fabricate passenger window shade 308 of FIGS. 3-4. Method 1500 can be used to fabricate passenger window shade 508 of FIGS. 5-6. Method 1500 can be used to fabricate passenger window shade 708 of FIGS. 7-8. Method 1500 can be used to fabricate passenger window shade 1000 of FIG. 10. Method 1500 can be used to fabricate passenger window shade 1100 of FIGS. 11-12. Method 1500 can be used to fabricate passenger window shade 1300 of FIGS. 13-14.

Method 1500 forms a first region of the passenger window shade having a first transmissivity for visible light, the first region having a first thickness (operation 1502). Method 1500 forms a second region of the passenger window shade having a second thickness less than the first thickness and a second transmissivity for visible light that is different from the first transmissivity such that an image visible from inside the aircraft is formed on a first face of the passenger window shade when visible light is aimed at a second face of the passenger window shade from outside the aircraft (operation 1504). Afterwards, method 1500 terminates.

In some illustrative examples, forming the first region of the passenger window shade comprises one of vacuum forming or injection molding (operation 1506). In some illustrative examples, forming the first region of the passenger window shade comprises depositing material on the second face of the passenger window shade to form the first thickness (operation 1508). By depositing material on the second face of the passenger window shade, the first thickness of first region is increased to decrease the transmissivity to visible light in the first region.

In some illustrative examples, forming the second region of the passenger window shade comprises one of vacuum forming or injection molding (operation 1510). In some illustrative examples, forming the second region of the passenger window shade comprises removing material from the second face of the passenger window shade (operation 1512).

In some illustrative examples, forming the second region of the passenger window shade comprises debossing material in the second region (operation 1514). Debossing material in the second region can be performed either during or following other forming operations. In some illustrative examples, debossing material in the second region is performed after one of injection molding or vacuum forming. In some illustrative examples, debossing material in the second region is performed during one of injection molding or vacuum forming.

In some illustrative examples, method 1500 attaches a decal to the first face of the passenger window shade over at least a portion of the second region (operation 1516). In some illustrative examples, the decal is bonded to the second material of the second region.

Figure 16:
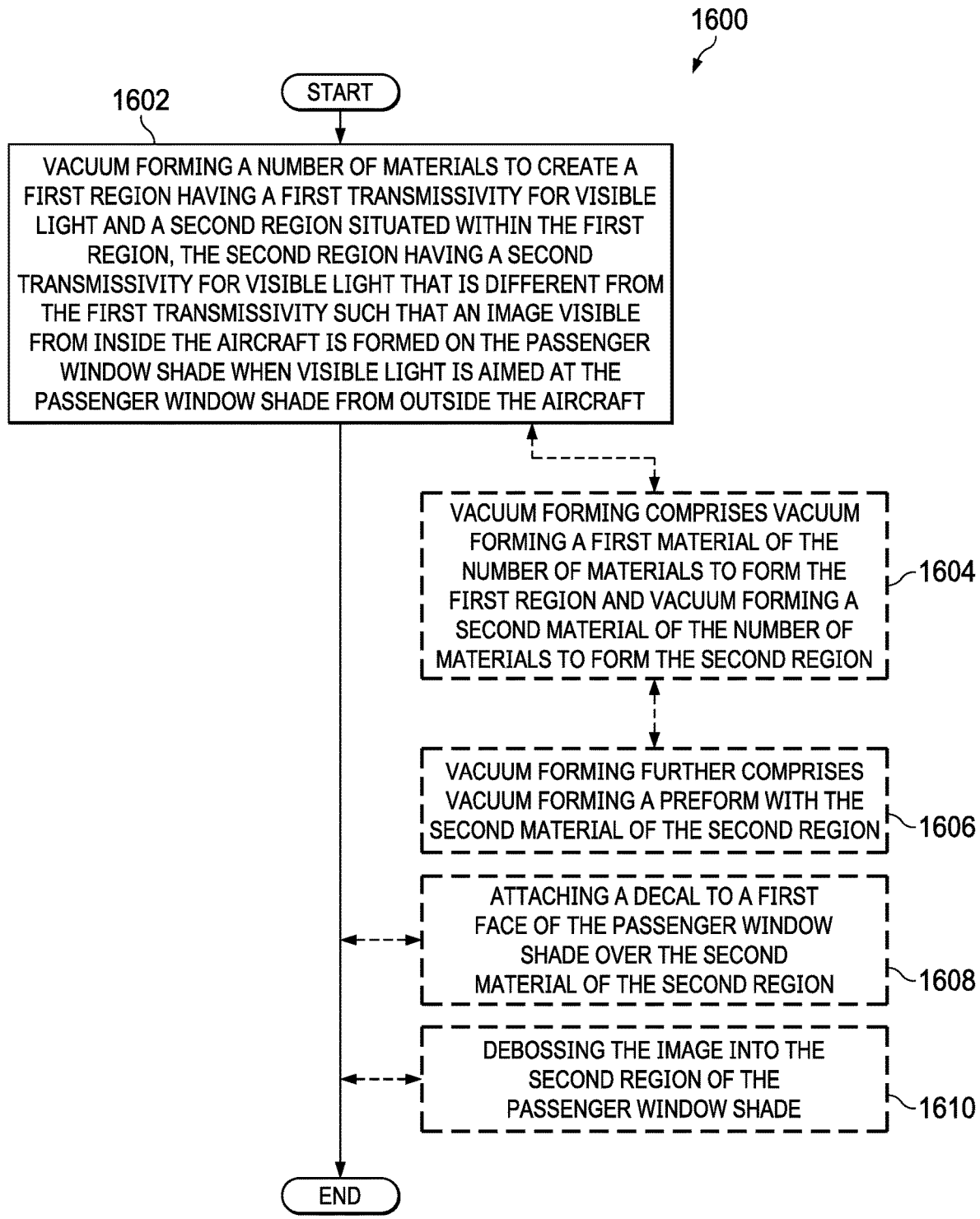
FIG. 16 is an illustration of a flowchart of a method of fabricating a passenger window shade of an aircraft in accordance with an illustrative embodiment.

Turning now to FIG. 16, an illustration of a flowchart of a method of fabricating a passenger window shade of an aircraft is depicted in accordance with an illustrative embodiment. Method 1600 can be used to fabricate a passenger window shade present in aircraft 100 of FIG. 1. Method 1600 can be used to fabricate passenger window shade 202 of FIG. 2. Method 1600 can be used to fabricate passenger window shade 308 of FIGS. 3-4. Method 1600 can be used to fabricate passenger window shade 508 of FIGS. 5-6. Method 1600 can be used to fabricate passenger window shade 708 of FIGS. 7-8. Method 1600 can be used to fabricate passenger window shade 1000 of FIG. 10. Method 1600 can be used to fabricate passenger window shade 1100 of FIGS. 11-12. Method 1600 can be used to fabricate passenger window shade 1300 of FIGS. 13-14.

Method 1600 vacuum forms a number of materials to create a first region having a first transmissivity for visible light and a second region situated within the first region, the second region having a second transmissivity for visible light that is different from the first transmissivity such that an image visible from inside the aircraft is formed on the passenger window shade when visible light is aimed at the passenger window shade from outside the aircraft (operation 1602). Afterwards, method 1600 terminates.

In some illustrative examples, vacuum forming comprises vacuum forming a first material of the number of materials to form the first region and vacuum forming a second material of the number of materials to form the second region (operation 1604). In some illustrative examples, vacuum forming further comprises vacuum forming a preform with the second material of the second region (operation 1606).

In some illustrative examples, method 1600 attaches a decal to a first face of the passenger window shade over the second material of the second region (operation 1608). In some illustrative examples, method 1600 debosses the image into the second region of the passenger window shade (operation 1610). The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, one or more of operations 1506 through 1516 may be optional. As another example, one or more of operations 1604 through 1610 may be optional.

Figure 17:
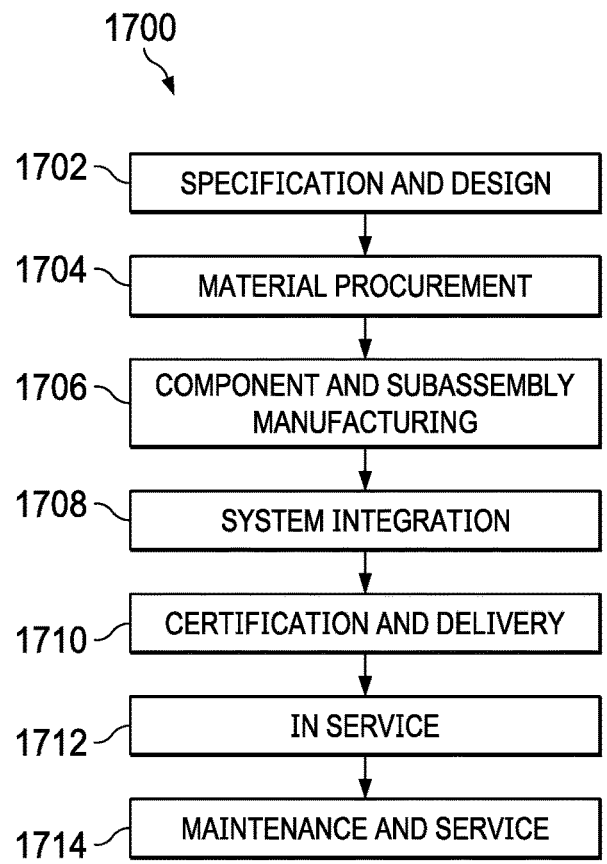
FIG. 17 is an illustration of an aircraft manufacturing and service method in the form of a block diagram in accordance with an illustrative embodiment.
Figure 18:
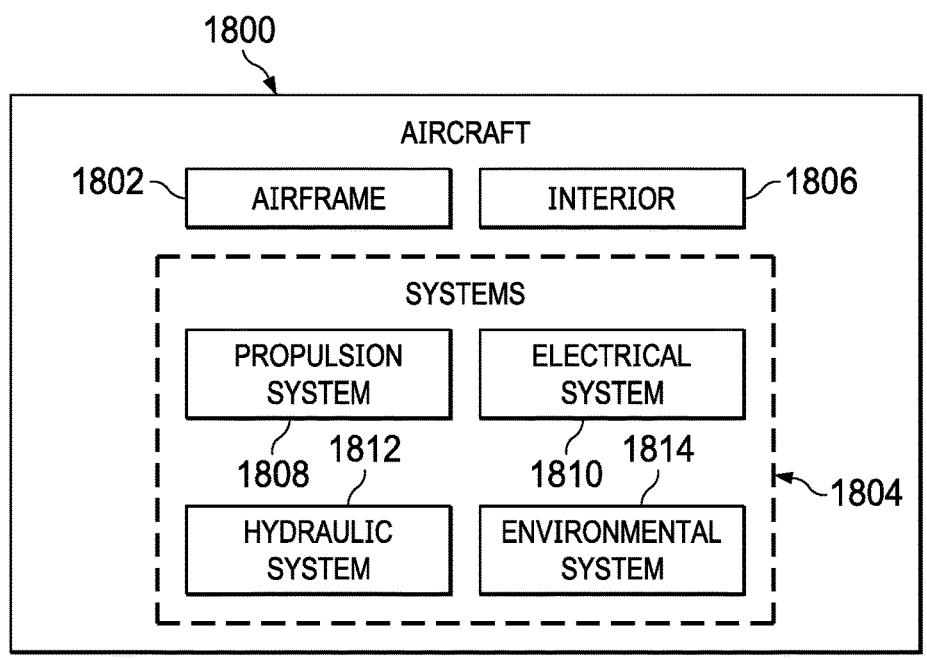
FIG. 18 is an illustration of an aircraft in the form of a block diagram in which an illustrative embodiment may be implemented.

Illustrative embodiments of the present disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 takes place. Thereafter, aircraft 1800 may go through certification and delivery 1710 in order to be placed in service 1712. While in service 1712 by a customer, aircraft 1800 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, environmental system 1814, and braking system 1816. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700. One or more illustrative embodiments may be used during component and subassembly manufacturing 1706, in service 1712, and maintenance and service 1714 of FIG. 17. For example, passenger window shade 202 of FIG. 2 may be manufactured and installed over passenger window 204 during component and subassembly manufacturing 1706 of aircraft manufacturing and service method 1700. As another example, passenger window shade 202 of FIG. 2 is used by passengers within passenger cabin 284 of aircraft 206 during in service 1712. As yet another example, passenger window shade 202 of FIG. 2 can be removed and replaced during maintenance and service 1714.

Passenger window shade 202 of FIG. 2 can be used within aircraft 1800 of FIG. 18. Passenger window shade 202 can be present within interior 1806 of aircraft 1800.

The illustrative examples present a passenger window shade that has an image only visible when visible light is shown onto an outboard face of the passenger window shade. The image is formed by two regions of the passenger window shade having differing transmissivities for visible light In the illustrative examples, the thickness and transparency of the separate regions are sufficiently thin such that visible light, such as sunlight, illuminates the image/feature. In the illustrative embodiments, unique colors and textures can also be introduced into the process by customizing 'preforms' fused or bonded to the parent material.

The level of semitransparency of one of the regions forms the image on the passenger window shade. In some illustrative examples, the level of semitransparency of the image/feature in relation to the parent material of the first region forms the illuminated image. In this illustrative example, the image/feature is sufficiently thin or transparent to allow visible light, such as sunlight, to illuminate the image/feature without undesirably affecting the overall strength and reliability of the passenger window shade.

These illustrative examples provide opportunities for airlines to display their branding feature from every passenger window in the aircraft. During the warmer months of the year, flight attendants and cleaning crews commonly lower the passenger window shades to prevent overheating the cabin while passengers are being seated. In addition, passenger window shades are commonly lowered by the passengers to increase visibility of personal electronic devices. When the passenger window shade of the illustrative examples is deployed, the feature or logo is illuminated from outside of the airplane (during daylight) providing an airline an opportunity to share their branding feature or logo. In addition to branding, airlines could also use the illustrative examples to display seat row numbers, decorative patterns, or other useful information.

The thickness and transparency of the regions of the passenger window shade are thin enough to allow visible light, such as sunlight, to illuminate one of the image/feature or the surrounding area. In some illustrative examples, creating the image/feature is accomplished by machining or abrading the surface of the passenger window shade to a thickness that allows visible light, such as sunlight, to pass through and illuminate the image/feature.

In some illustrative examples, debossing the image/feature into the passenger window shade is performed during the primary manufacturing process, such as injection molding. In some illustrative examples, debossing the image/feature into the passenger window shade is performed during secondary operations such as etching, machining, or pressing.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A passenger window shade on an aircraft, comprising:

a first region having a first transmissivity for visible light; and a second region situated within the first region, the second region having a second transmissivity for visible light that is different from the first transmissivity such that an image visible from inside the aircraft is formed on the passenger window shade when visible light is aimed at the passenger window shade from outside the aircraft, wherein the second region is formed through debossing into the passenger window shade.

2. The passenger window shade of claim 1, wherein the first region and the second region comprise different materials.

3. The passenger window shade of claim 1, wherein the first region has a first thickness and the second region has a second thickness, and wherein the first thickness and the second thickness comprise different thicknesses.

4. The passenger window shade of claim 1, wherein the first region and the second region comprise at least two different colors.

5. The passenger window shade of claim 1, wherein the image is visible in an illuminated state when visible light is directed at the passenger window shade.

6. The passenger window shade of claim 1, wherein the image is a non-electric branding feature.

7. A passenger window shade on an aircraft, comprising:
a first region having a first transmissivity for visible light;
a second region situated within the first region, the second region having a second transmissivity for visible light that is different from the first transmissivity such that an image visible from inside the aircraft is formed on the passenger window shade when visible light is aimed at the passenger window shade from outside the aircraft; and a decal attached to material of the second region.

8. The passenger window shade of claim 7, wherein the image forms an outline for a design of the decal.

9. The passenger window shade of claim 8, wherein the image is visible in an illuminated state when visible light is directed at the passenger window shade.

10. The passenger window shade of claim 8, wherein the image is a non-electric branding feature.

11. The passenger window shade of claim 7, wherein the image provides color to a design of the decal when illuminated.

12. The passenger window shade of claim 7, wherein the first region and the second region comprise different materials.

13. The passenger window shade of claim 7, wherein the first region has a first thickness and the second region has a second thickness, and wherein the first thickness and the second thickness comprise different thicknesses.

14. The passenger window shade of claim 7, wherein the first region and the second region comprise at least two different colors.

15. The passenger window shade of claim 7, wherein the image is visible in an illuminated state when visible light is directed at the passenger window shade.

16. The passenger window shade of claim 7, wherein the image is a non-electric branding feature.

* * * * *